United States Patent
Hirata

[15] 3,670,080
[45] June 13, 1972

[54] PROCESS FOR STABILIZATION OF A COMPOSITION OF $2\alpha,3\alpha$-EPITHIO-ANDROSTANES AND COMPOSITION OBTAINED THEREBY

[72] Inventor: Masaharu Hirata, Suita, Japan

[73] Assignee: Shionogi & Co., Ltd., Osaka, Japan

[22] Filed: March 2, 1970

[21] Appl. No.: 15,826

[30] Foreign Application Priority Data

March 6, 1969 Japan....................................44/17118

[52] U.S. Cl..........................................424/241, 260/239.5
[51] Int. Cl.........................................................C07c 173/00
[58] Field of Search..............................................260/239.5

[56] References Cited

UNITED STATES PATENTS 3,567,713  3/1971  Komeno ............................260/239.5

*Primary Examiner*—Elbert L. Roberts
*Attorney*—Wenderoth, Lind and Ponack

[57] ABSTRACT

A very stable composition of $2\alpha,3\alpha$-epithio-androstanes comprising $2\alpha,3\alpha$-epithio-androstane, basic substance and/or surface active agent, and a process for preparation thereof. The composition is useful as a medicament, because it can be stored for extended times and shows strong anabolic, myogenic, androgenic, uterotropic, antiestrogenic, antiuterotropic and antifertility activities.

46 Claims, No Drawings

PROCESS FOR STABILIZATION OF A COMPOSITION OF 2α,3α-EPITHIO-ANDROSTANES AND COMPOSITION OBTAINED THEREBY

This invention relates to a stable composition of 2α,3α-epithio-androstanes comprising 2α,3α-epithio-androstane, basic substance and/or surface active agent, and a process for stabilization of a composition of 2α,3α-epithio-androstanes. More particularly, it is concerned with a stable composition of 2α,3α-epithio-androstanes which comprises (a) a basic substance and/or a surface active agent and (b) a compound of the general formula I

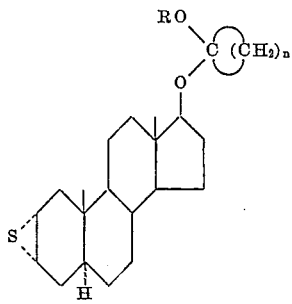

(I)

wherein R is a lower alkyl group (e.g. methyl, ethyl, propyl, isopropyl, butyl, isobutyl, t-butyl, pentyl) and $n$ is an integer of from 4 to 6 and/or a compound of the general formula II

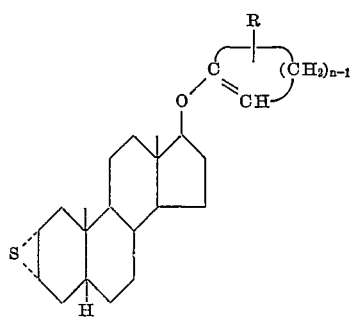

(II)

wherein R is a hydrogen atom or lower alkyl group (e.g. methyl, ethyl, propyl, butyl, pentyl) and $n$ is an integer of from 4 to 6. The composition is advantageous as a medicament, because it is very stable for a long time without losing activity and exhibits marked pharmacological activities including anabolic, myogenic, androgenic, uterotropic, antiuterotropic, antiestrogenic and antifertility activities.

Although 2α,3α-epithio-androstane-17β-ols having strong anabolic, antiestrogenic and antifertility activities are excellent steroid hormones [Tetrahedron, 21 329 (1965)], sufficient pharmaceutical effects cannot be expected from the said compounds when orally administered. Recently, 17β-ketal derivatives or 17β-cycloalkenyl derivatives of 2α,3α-epithio-androstane have been synthesized as orally administrable compounds. They show strong hormonic and anti-hormonic activities, especially myogenic and anabolic activities (Japanese Pat. application Nos. 42/5718 and 43/53254). These compounds are, however, considerably limited in their practical uses, because they cannot be stored for extended times, probable due to instability of the epithio group, located at the position 2α, 3α of the steroid nucleus, and 17β-substituents to acids and to heat. Thus, a stable composition of the said epithio-steroids has been earnestly desired.

As a result of investigation on enhancement of stability of the 2α,3α-epithio-steroids, the present inventor has discovered that a very stable composition of 2α,3α-epithio-androstanes can be obtained by adding a basic substance and/or a surface active agent in an amount of 0.01 to 20 percent by weight, to a compound of the general formula I

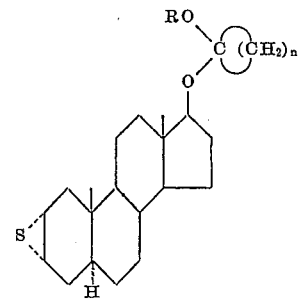

(I)

wherein R is a lower alkyl group having one to five carbon atoms and $n$ is an integer of from 4 to 6 and/or to a compound of the general formula II

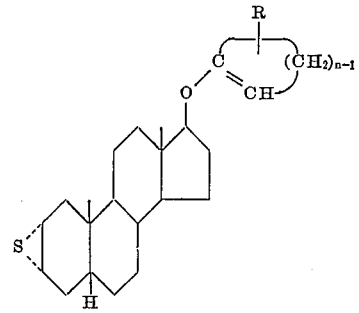

(II)

wherein R is a hydrogen atom or lower alkyl group having one to five carbon atoms and $n$ is an integer of from 4 to 6.

It is, therefore, an object of the invention to produce a very stabilized composition of 2α,3α-epithio-androstanes represented by the general formulae I and II. Further object of the invention is to embody a process for stabilizing a composition of 2α,3α-epithio-androstanes.

Typical examples of 2α, 3α-epithio-androstanes represented by the general formulae I and II are 2α,3α-epithio-17β-(1-methoxycyclopentyloxy)-5α-androstane, 2α,3α-epithio-17β-(1-ethoxycyclopentyloxy)-5α-androstane, 2α,3α-epithio-17β-(1-propoxycyclopentyloxy)-5α-androstane, 2α,3α-epithio-17β-(1-isopropoxycyclopentyloxy)-5α-androstane, 2α,3α-epithio-17β-(1-t-butoxycyclopentyloxy)-5α-androstane, 2α,3α-epithio-17β-(1-pentyloxycyclopentyloxy)-5α-androstane, 2α,3α-epithio-17β-(1-methoxycyclohexyloxy)-5α-androstane, 2α,3α-epithio-17β-(1-ethoxycyclohexyloxy)-5α-androstane, 2α,3α-epithio-17β-(1-propoxycyclohexyloxy)-5α-androstane, 2α,3α-epithio-17β-(1-butoxycyclohexyloxy)-5α-androstane, 2α,3α-epithio-17β-(1-methoxycycloheptyloxy)-5α-androstane, 2α,3α-epithio-17β-(1-ethoxycycloheptyloxy)-5α-androstane, 2α,3α-epithio-17β-(1-propoxycycloheptyloxy)-5α-androstane, 2α,3α-epithio-17β-(1-isobutoxycycloheptyloxy)-5α-androstane, 2α,3α-epithio-17β-(1-pentoxycycloheptyloxy)-5α-androstane, 2α,3α-epithio-17β-(1-cyclopentenyloxy)-5α-androstane, 2α,3α-epithio-17β-(1-cyclohexenyloxy)-5α-androstane, 2α,3α-epithio-17β-(1-cycloheptenyloxy)-5α-androstane, 2α,3α-epithio-17β-(3-methyl-1-cyclohexenyloxy)-5α-androstane and the like.

The 2α,3α-epithio-androstanes of the general formula I can be prepared by reacting a compound of the formula

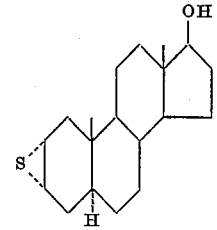

with a derivative of cycloalkanone represented by the general formula

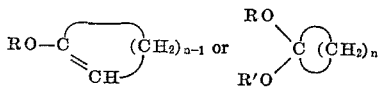

wherein R and R' each is a lower alkyl group and $n$ is an integer of from 4 to 6, in the presence of a minor amount of acid catalyst, as described in Japanese Patent application No. 42/5718.

The other 2α,3α-epithio-androstanes of the general formula II can be prepared by reacting a compound of the formula

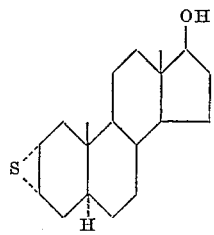

with a compound of the general formula

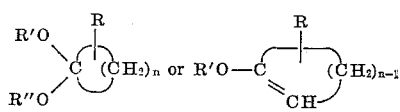

wherein R is a hydrogen atom or a lower alkyl group, n is an integer of from 4 to 6, R' and R'' each is a lower alkyl group, benzyl group or phenyl group and R' and R'' combined together represents a lower alkylene group, in the presence of acidic substance, or by heating a compound of the general formula

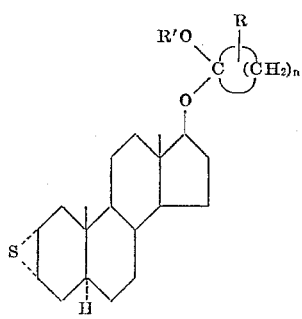

wherein R is a hydrogen atom or a lower alkyl group, R' is a lower alkyl group, benzyl group or phenyl group and $n$ is an integer of from 4 to 6, in the presence or absence of an acid or an organic base, as disclosed in Japanese Pat. application No. 43/53254.

Basic substances to be added as a stabilizing agent in the present composition may be divided into two general classes. i.e. inorganic bases and organic bases. The inorganic base includes, for example, sodium carbonate, sodium hydrogen carbonate, potassium carbonate, lithium carbonate, disodium hydrogen phosphate, hydrazine, methyl hydrazine, hydroxylamine and a mixture thereof. As the organic base there are exemplified aliphatic alkyl amine (e.g. diethylamine, diisopropylamine, dipropylamine, triethylamine, tributylamine, propylenediamine), alcohol amine (e.g. monoethanol amine, diethanol amine, triethanol amine, 2-amino-2-methylpropanol, 2-amino-2-methyl-1,3-propanediol, tris-(hydroxymethyl)aminoethane), amino acid (e.g. arginine, lysine, ornithine, cysteine), aliphatic heterocyclic amine (e.g. piperidine, piperazine, morpholine, methenamine), amide compound (e.g. lidocaine, procaine, nicotinamide, pyrazinamide), aromatic heterocyclic amine (e.g. O,S-bisethoxycarbonylthiamine, pyridoxine, imidazole, pyridine, picoline), aromatic amine (e.g. diphenylamine, N,N'-dibenzylethylenediamine) and a mixture thereof.

Surface active agent as the other additive to stabilize the epithio-steroids includes, for instance, fatty acid glyceride (e.g. oleic acid monoglyceride, oleic acid diacetylglyceride, stearic acid triglyceride), sorbitan fatty acid ester (e.g. sorbitol stearate, sorbitol oleate), polyglycerine ester (e.g. hexaglycerol monooleate, decaglycerol tetraoleate), polyoxyethylene sorbitan fatty acid ester (e.g. polyoxyethlene sorbitan monolaurate, polyoxyethylene sorbitan monopalmitate, polyoxyethylene sorbitan monooleate), polyalkylene glycol (e.g. polyethylene glycol, polypropylene glycol), polyoxyalkylene alkyl amine (e.g. polyoxyethylene oleyl amine), polyoxyalkylene alkyl ether (e.g. polyoxyethylene cetyl ether), polyvinylpyrrolidone and a mixture thereof and the like. A mixture of the basic substance and the surface active agent as mentioned above can be also employed as the stabilizing agent in this invention.

Preferred amount of the additive as a stabilizing agent (basic substance, surface active agent) is about 0.01 to 20 percent by weight to a total amount of the present composition. In preparing a solid preparation of 2α,3α-epithio-androstanes, it is preferred to mix the additive well with a suitable base and add the mixture to a basis, i.e. 2α,3α-epithio-steroids. In case of an oily preparation the additive is dissolved in advance in a suitable oily substance, and then a basis is added to the solution. When the additive is solid, it is advantageous in the preparation of an oily composition to use a supernatant solution which is obtained by shaking and saturating the basis and the additive.

A stable oily composition of 2α,3α-epithio-androstanes can be prepared, for example, in the following manner. An additive is first dissolved in a base (oily substance), and to the solution are added microcrystals of the epithio-androstanes. If necessary, the additive is dissolved in an oily substance with gentle heating and stirring, or a solution of the epithio-androstane in a solvent with low boiling point, such as acetone or ether, is added to an oily substance containing the additive, and the solvent is removed by introducing an inert gas (e.g. nitrogen, helium) therein or under reduced pressure. In the above procedure it is preferred to effect the dissolution of the epithio-androstanes under an atmosphere of an inert gas such as nitrogen or helium to exclude moisture or oxygen and while sheltered from the sun-light. The thus obtained oily solution is placed in ampoules, vials, hard capsules, soft capsules or the like in a per se conventional manner to make a very stabilized composition of 2α,3α-epithio-androstanes, which can be practically used in the dosage form of injections or capsules.

As a base in the above oily preparation of 2α,3α-epithio-androstanes, oily substances such as higher fatty alcohol (e.g. decyl alcohol, lauryl alcohol, myristyl alcohol, cetyl alcohol, stearyl alcohol), higher fatty acid ester (e.g. methyl laurate, isopropyl laurate, butyl laurate, isopropyl myristate, butyl palmitate, methyl stearate, isopropyl stearate, cetyl stearate, myristyl stearate, decyl oleate, diisopropyl adipate) or vegetable oil (e.g. sesame oil, olive oil, rice-bran oil, soya bean oil, cotton-seed oil, peanut oil, castor oil) are advantageously employed. Naturally, a mixture of those oily substances can be used in the present invention. Preferred oils are those which contain the smallest possible amount of water, oxygen gas dissolved therein and other impurities and do not have free acid radicals possibly.

On the other hand, a stable solid preparation of 2α,3α-epithio-androstanes can be prepared in the following manner. In case of stabilized tablets of the said compounds, a base (vehicle) is throughly mixed with an additive (basic substances and/or surface active agent), and to the mixture is added a solution of 2α,3α-epithio-androstanes in a solvent with low boiling point such as acetone or ether. The solvent is removed by gentle heating or under reduced pressure, if necessary, and the resultant mixture is added with an excipient to make a dust, a lubricant being added therein when necessary. The dust is compressed to tablets according to a conventional manner per se. Also, the dust may be tabletted, after being granulated by the known method per se. In this connection, a powder, capsule, pill and granule of stabilized 2α,3α-epithio-androstanes can be formulated using the dust obtained above, according to a usual method employed in the art.

As the excipient there are exemplified lactose, maltose, glucose, galactose, mannitol, inositol, starch, avicel (microcrystalline form of cellulose) and the like. In using lactose or maltose, decomposition of $2\alpha,3\alpha$-epithio-androstanes occurs when the dust containing the epithio-steroids is compressed to tablets. Such decomposition can be completely avoided by coating the said excipient with polyethylene glycol or adding the before the mentioned basic substance or avicel to the excipient, before tabletting procedure.

Lubricants includes, for example, sodium alginate, purified talc, magnesium stearate, calcium stearate, polyethylene glycol and liquid paraffin and the like.

The present invention may be applied to other conventional dosage form. e.g. suspensions, emulsions, syrups, suppositories or solutions, all of which can be prepared by using the present inventive concept and modes to those skilled in the art.

The present composition may be flavored, colored and coated according to the necessity.

Thus obtained composition of $2\alpha,3\alpha$-epithio-androstanes is very stable for a longer time, in comparison with a preparation obtained according to a conventional prescription, as shown clearly in the hereinafter disclosed working examples.

The composition of this invention shows excellent pharmacological effects in its practical use. For example, the composition may be utilized for treatment of malnutrition, recovery from emaciation, convalescence, senility, wasting diseases and disorders of nutrition, promotion of growth of immature infant, promotion of granulation and protein metabolism, increase in body weight, stimulation of appetite, and for treatment of diseases or conditions demanding anabolic agents, or for implantation inibition, mastopathy, mammary cancer, endometriosis, regulation of conception, corpulency, etc., for humans, veterinary, and poultry use. The present composition can be administered orally or parenterally in a dosage form of injections, suspensions, emulsions, syrups, solutions, tablets, granules, pills, powders, capsules or the like, where the $2\alpha,3\alpha$-epithio-androstanes are contained in such amounts as to permit a dosage of 1 $\gamma$ to 500 mg per kilogram of body weight for a day. The administration thereof is repeated as often as required by the physician or veterinary.

The following examples are given by way of illustration only and are not intended as limitations of the present invention, many apparent variations of which are possible without departing from the spirit and scope thereof.

Now, in the examples given below, the control is a preparation which do not contain the present additive as a stabilizing agent. The amount of remaining epithio-steroids after storage was determined by gas chromatography. That is, in the case of an oily preparation, the oily solution was diluted with ethylene dichloride to a one-tenth concentration, and the diluted solution was combined with an acetone solution of $5\alpha$-androstane-3,17-dione as a reference marker. An aliquot (1.5 $\mu l$) of the mixture was subjected to a gas chromatography and the amount of remaining epithio-steroids was determined by calculating the peak area. The amount of remaining epithio-steroids in a solid preparation was determined in a similar manner, except for using an extract of the epithio-steroid with ethylene dichloride.

EXAMPLE 1

To a mixture of isopropyl myristate (10 ml) and triethylamine (0.03 ml) is added $2\alpha,3\alpha$-epithio-$17\beta$-(1-methoxycyclopentyloxy)-$5\alpha$-androstane (100 mg). The resulting solution is used to fill a hard capsule and allowed to stand at 45° C. for 100 days. The remaining amount of the epithio-steroid was analyzed quantitatively by gas chromatography. The result indicated 100 percent remaining. On the other hand, in the same test on stability the amount remaining of the same steroid was 0 percent in the hard capsule in the absence of triethylamine.

Under the same condition, when the triethylamine was substituted by dipropylamine, the amount remaining epithio-steroid was 99 percent, and that of the control 0 percent.

EXAMPLE 2

Sodium carbonate (1 g) is added to isopropyl myristate (100 ml) and shaken for 20 minutes to prepare a saturated solution, which is then centrifugalized for 15 minutes. To the resulting supernatant solution (10 ml) is added $2\alpha,3\alpha$-epithio-$17\beta$-(1-methoxycyclopentyloxy)-$5\alpha$-androstane (100 mg). The thus resulting solution is used to fill a hard capsule and allowed to stand at 45° C. for 100 days. The remaining amount of the epithio-steroid was 89 percent.

On the contrary the amount of remaining steroid in the control was 0 percent.

Under the same condition, when the sodium carbonate was substituted by tris(hydroxymethyl)aminoethane, the amount of remaining epithio-steroid was 72 percent, and that of the control 0 percent.

EXAMPLE 3

To a mixture of sesame oil (10 ml) and triethylamine (0.03 ml) is added $2\alpha,3\alpha$-epithio-$17\beta$-(1-methoxycyclopentyloxy)-$5\alpha$-androstane (100 mg). The resulting solution is placed in a hard capsule and allowed to stand at 45° C. for 100 days. The amount of remaining epithio-steroid in the hard capsule was 95 percent, and that of the control 0 percent.

Similarly, the test was conducted by means of variously substituting the basic material. The results were as follows.

| Basic Material | The Rate of Remaining | |
| --- | --- | --- |
| | Stable Preparation | Control |
| Dipropylamine | 96% | 0% |
| Sodium Carbonate | 82% | 0% |
| Tris(hydroxymethyl)aminoethane | 74% | 0% |
| 2-Amino-2-methyl-1,3-propanediol | 33% | 0% |
| Arginine | 98% | 0% |

EXAMPLE 4

To a mixture of isopropyl myristate (10 ml) and triethylamine (0.03 ml) is added $2\alpha,3\alpha$-epithio-$17\beta$-(1-methoxycyclopentyloxy)-$5\alpha$-androstane (100 mg). The resulting solution is placed in a hard capsule and allowed to stand at 45° C. for 260 days. The remaining amount of the epithio-steroid was 97 percent, and that of the control 0 percent.

The tests conducted with $2\alpha,3\alpha$-epithio-$17\beta$-(1-ethoxycyclopentyloxy)-$5\alpha$-androstane, $2\alpha,3\alpha$-epithio-$17\beta$-(1-methoxycyclohexyloxy)-$5\alpha$-androstane, $2\alpha,3\alpha$-epithio-$17\beta$-(1-ethoxycyclohexyloxy)-$5\alpha$-androstane, and other epithio-steroids afforded similar results to that described above.

EXAMPLE 5

To a mixture of sesame oil (10 ml) and triethylamine (0.03 ml) is added $2\alpha,3\alpha$-epithio-$17\beta$-(1-methoxycyclopentyloxy)-$5\alpha$-androstane (100 mg). The resulting solution is sealed up in a hard capsule and allowed to stand at 37° C. for 280 days. The amount of remaining epithio-steroid was 95 percent, and that of the control 0 percent.

The substitution of the sesame oil with a vegetable oil such as olive oil, rice bran oil, soybean oil, etc. afforded a similar result.

EXAMPLE 6

As a substitute for the triethylamine, a supernatant solution of a mixture of sodium carbonate and sesame oil was used and the amount remaining was examined according to the same procedure as Example 5. The results indicated 50 percent remaining in the said preparation and 0 percent in the control.

The substitution of the sodium carbonate with sodium bicarbonate, afforded a similar result.

EXAMPLE 7

As a substitute for the triethylamine, a supernatant solution of a mixture of arginine and sesame oil was used and the test was conducted according to the same procedure as Example 5. The amount of remaining steroid in the hard capsule was 59 percent, and that of the control 0 percent.

The substitution of the arginine with lysine, ornithine, histidine, or cysteine afforded similarly preferable results.

EXAMPLE 8

As a substitute for the sesame oil, isopropyl myristate was used and the test was conducted according to the same procedure as Example 5. The amount of remaining epithio-steroid was 96 percent, and that of the control 0 percent.

In this experiment, furthermore, the substitution of the isopropyl myristate with butyl myristate, isopropyl adipate, methyl laurate, butyl palmitate, isopropyl stearate, or other higher fatty acid esters as described above, also afforded the surprisingly remarkable effect of stabilization.

EXAMPLE 9

To a solution of diethylamine (0.03 ml) in isopropyl myristate (10 ml) is added $2\alpha,3\alpha$-epithio-17$\beta$-(1-methoxycyclopentyloxy)-5$\alpha$-androstane (100 mg). The resulting solution is placed in a hard capsule and allowed to stand at 37° C. for 280 days. The remaining amount of the epithio-steroid was 94 percent, and that of the control 0 percent.

The substitution of the diethylamine with an aliphatic alkylamine such as dipropylamine, dibutylamine, or the like afforded similarly preferably results.

EXAMPLE 10

Tris(hydroxymethyl)aminoethane (1 g) is saturated in isopropyl myristate (100 ml) under shaking for 20 minutes, and then centrifugalized for 15 minutes. To the resulting supernatant solution (10 ml) is added $2\alpha,3\alpha$-epithio-17$\beta$-(1-methoxycyclopentyloxy)-5$\alpha$-androstane (100 mg). The thus resulting solution is placed in a hard capsule and allowed to stand at 37° C. for 280 days. The remaining amount of the epithio-steroid was 94 percent, and that of the control 0 percent.

The substitution of the tris(hydroxymethyl)aminoethane with monoethanol amine, 2-amino-2-methyl-1,3-propanediol, or other alcohol amines afforded similar effects for the stabilization.

EXAMPLE 11

As a substitute of tris(hydroxymethyl)amino-ethane, sodium carbonate was used and the amount of remaining epithio-steroid was measured according to the same procedure as Example 10. The results indicated 69 percent remaining in the said preparation and 0 percent in the control.

EXAMPLE 12

To a mixture of sesame oil (10 ml) and triethylamine (0.01 ml) is added $2\alpha,3\alpha$-epithio-17$\beta$-(1-methoxycyclopentyloxy)-5$\alpha$-androstane (125 mg). The resulting solution is placed in a soft elastic capsule base and allowed to stand at 45° C. for 90 days. The remaining amount of the epithio-steroid was 98 percent, and that of the control 62 percent.

Under the same condition, a supernatant solution of a mixture of O,S-diethoxycarbonylthiamine and sesame seed oil was used as a substitute for the triethylamine. The amount remaining epithio-steroid was 79 percent, and that of the control 62 percent.

EXAMPLE 13

To a mixture of isopropyl myristate (10 ml) and triethylamine (0.02 ml) is added $2\alpha,3\alpha$-epithio-17$\beta$-(1-methoxycyclopentyloxy)-5$\alpha$-androstane (125 mg). The resulting solution is placed in soft elastic capsules and allowed to stand at 45° C. for 190 days. The amount of remaining epithio-steroid was 96 percent, and that of the control 68 percent.

When 2-amino-2-methyl-1,3-propanediol was used as a substituent for the triethylamine, the rate of remaining was 90 percent.

EXAMPLE 14

To a mixture of isopropyl myristate (10 ml) and triethylamine (0.01 ml) is added $2\alpha,3\alpha$-epithio-17$\beta$-(1-methoxycyclopentyloxy)- 5$\alpha$-androstane (110 mg). The resulting solution is placed in a soft elastic capsule base and allowed to stand at 45° C. for 70 days. The remaining amount of the epithio-steroid in the soft elastic capsule was 99 percent, and that of the control 88 percent.

Similarly, when 2-amino-2-methyl-1,3-propanediol was used as a substitute for the triethylamine, the amounts of remaining epithio-steroid in the soft elastic capsule was 98 percent, and that of the control 88 percent.

EXAMPLE 15

As a substitute for the triethylamine, polyoxyethylene cetyl ether was used and the test was conducted according to the same procedure as Example 14. The remaining amount of the epithio-steroid was 100 percent, and that of the control 88 percent.

EXAMPLE 16

To a mixture of isopropyl myristate (10 ml) and polyoxyethylene oleylamine (0.01 ml) is added $2\alpha,3\alpha$-epithio-17$\beta$-(1-methoxycyclopentyloxy)-5$\alpha$-androstane (100 mg). The resulting solution is sealed up in a vial while filling up in a atmosphere of nitrogen and allowed to stand at 45° C. for 55 days. The remaining amount of the epithio-steroid was 95 percent, and that of the control 0 percent.

In the same tests, the amount remaining of $2\alpha,3\alpha$-epithio-17$\beta$-(1-ethoxycyclopentyloxy)-5$\alpha$-androstane, $2\alpha,3\alpha$-epithio-17$\beta$-(1-methoxycyclohexyloxy)-5$\alpha$-androstane, and $2\alpha,3\alpha$-epithio-17$\beta$-(1-ethoxycyclohexyloxy)-5$\alpha$-androstane were 93 percent, 98 percent, and 96 percent, respectively.

EXAMPLE 17

As a substitute for the polyoxyethylene oleylamine, diacetyloleyl glyceride was used and the test was conducted according to the same procedure as Example 16. The amount of remaining was 32 percent, and that of the control 0 percent.

EXAMPLE 18

As a substitute for the triethylamine, polyoxyethylene sorbitan monooleate (Tween 80) (0.08 ml) was used and the test was conducted according to the same procedure as Example 12. the amount remaining was 97 percent, and that of the control 62 percent.

Similarly, when Pluronic 64 (polyoxyethyleneglycol + polyoxypropyleneglycol) (0.1 ml) was used, the amount of remaining epithio-steroid was 93 percent.

EXAMPLE 19

To a mixture of isopropyl myristate (10 ml) and dipropylamine (0.03 ml) is added $2\alpha,3\alpha$-epithio-17$\beta$-(1-cyclopentenyloxy)-5$\alpha$-androstane (100 mg). The resulting solution is filled up and sealed in an ampoule while using a nitrogen, atmosphere and then allowed to stand at 45° C. for 310 days. The amount of remaining epithio-steroid in the ampoule was 96 percent, and that of the control 0 percent.

In the same manner, $2\alpha,3\alpha$-epithio-17$\beta$-(1-cyclohexenyloxy)-5$\alpha$-androstane was treated. The amount remaining was 93 percent, and that of the control 0 percent.

EXAMPLE 20

2α,3α-Epithio-17β-(1-propoxycyclopentyloxy)-5α-androstane (100 mg) was treated in the same manner as Example 5. The amount of remaining epithio-steroid was 93 percent, and that of the control 0 percent.

In the case of 2α,3α-epithio-17β-(1-butoxycyclohexyloxy)-5α-androstane, the same preferable effect was obtained. (the amount remaining: 94 percent)

EXAMPLE 21

A supernatant solution (10 ml) prepared by shaking methenamine with sesame oil to saturate was treated in the same manner as Example 5, and the remaining amount of the epithio-steroid was analyzed quantitatively. The results indicated 90 percent remaining in the said preparation, and 0 percent in the control.

EXAMPLE 22

A supernatant solution (10 ml) prepared by shaking pyrazinamide (1 g) with isopropyl myristate (100 ml) to saturate some was treated in the same manner as Example 9. The amount of remaining epithio-steroid was 94 percent, and that of the control 0 percent.

Similarly, the use of pyrimidine afforded the excellent effect of stabilization.

EXAMPLE 23

As a substitute for the triethylamine, diphenylamine was used, and the remaining amount of the epithio-steroid was measured according to the procedure corresponding to Example 1. The results indicated 96 percent remaining in the said preparation and 0 percent in the control.

EXAMPLE 24

As a substitute for the sesame oil, lauryl alcohol was used and the test was conducted in the same procedure as Example 3. The remaining amount of the epithio-steroid was in the rate of 95 percent and that of the control 0 percent.

EXAMPLE 25

Lactose (9.7 g) is mixed well with 2-amino-2-methyl-1,3-propanediol (0.3 g). An acetone solution (10 ml) of 2α,3α-epithio-17β-(1-methoxycyclopentyloxy)-5α-androstane (0.1 g) is added thereto and mixed well to give a powder. The thus resulting power is compressed to tablets and the remaining amount of the epithio-steroid in the tablets is immediately measured by means of gas chromatography. The amount remaining was 100 percent.

On the contrary, the amount remaining in the tablets involving no basic material as described above was 0 percent at the time of the preparation.

EXAMPLE 26

Avicel (2 g) and lactose (7.0 g) are mixed well with 2-amino-2-methyl-1,3-propanediol (1 g). An acetone solution (10 ml) of 2α,3α-epithio-17β-(1-methoxycyclopentyloxy)-5α-androstane (0.1 g) is added thereto and mixed well, and then the acetone is removed. The thus resulting powder is compressed to tablets and allowed to stand at 25° C. under a fixed condition of relative humidity 45 percent for 40 days. The remaining amount of the epithio-steroid was analyzed quantitatively by means of gas chromatography. The result indicated 100 percent remaining.

On the contrary, the amount remaining in the control was 70 percent.

EXAMPLE 27

Tris(hydroxymethyl)aminoethane (0.6 g) is mixed well with avicel (9.5 g), and an acetone solution (10 ml) of 2α,3α-epithio-17β-(1-methoxycyclopentyloxy)-5α-androstane (0.1 g) is then added thereto and mixed well. The thus resulting powder is compressed to tablets and kept in a vessel preliminarily containing a desiccant (calcium chloride) at 45° C. for 21 days. The remaining amount of the epithio-steroid was 92 percent.

On the contrary, the amount of remaining epithio-steroid in the control was 72 percent.

EXAMPLE 28

As a substitute for the tris(hydroxymethyl)aminoethane, polyoxyethylene cetyl ether was used and the test was conducted in the same procedure as Example 27. The remaining amount of the epithio-steroid was of 90 percent.

EXAMPLE 29

Avicel (9.5 g), 2-amino-2-methyl-1,3-propanediol (0.25 g), and polyvinylpyrrolidone (0.25 g) are mixed well. An acetone solution (10 ml) of 2α,3α-epithio-17β-(1-methoxycyclopentyloxy)-5α-androstane (100 mg) is added thereto and mixed well. The resulting powder is compressed to tablets and kept in a vessel preliminarily containing a desiccant at 45° C. for 21 days. The remaining amount of the epithio-steroid was 90 percent.

On the other hand, the amount remaining in the control in the above-described test was 72 percent.

EXAMPLE 30

Avicel (9.5 g) is mixed well with tris(hydroxymethyl)-aminoethane (0.50 g), and an acetone solution (10 ml) of 2α,3α-epithio-17β-(1-methoxycyclopentyloxy)-5α-androstane (0.10 g) is added thereto and mixed well. The thus resulting powder is packed in a hard capsule and kept in a vessel preliminarily containing a desicant at 45° C. for 120 days. The remaining amount of the epithio-steroid was of 91 percent, and on the contrary 62 percent in the control.

EXAMPLE 31

As a substitute for the tris(hydroxymethyl)aminoethane, polyoxyethylene cetyl ether was used and the test conducted in the same procedure as Example 30. The remaining amount of the epithio-steroid was 90 percent.

EXAMPLE 32

Avicel (9.5 g) is mixed well with 2-amino-2-methyl-1,3-propanediol (0.5 g). An acetone solution (10 ml) of 2α,3α - epithio-17β-(1-methoxycyclopentyloxy)-5α-androstane (0.1 g) is added thereto and mixed well, Additionally, magnesium stearate (0.5 g) is mixed thereto, and the resulting powder is compressed to tablets and allowed to stand at 45° C. for 20 days. The remaining amount of the epithio-steroid was 90 percent. On the contrary, the amount remaining in the control was 57 percent.

What is claimed is:

1. A stable composition of a 2α, 3α-epithio-androstane of the general formula:

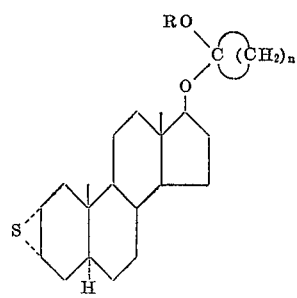

wherein R is a lower alkyl group having one to five carbon atoms and $n$ is an integer of 4–6, containing an effective and non-toxic amount of a stabilizer selected from the group consisting of (a) an inorganic base selected from the group consisting of an alkali metal base, hydrazine, methylhydrazine, hydroxylamine and mixtures thereof, (b) an organic base selected from the group consisting of aliphatic lower alkyl amine, alcohol amine, amino acid, aliphatic heterocyclic amine, amide compound, aromatic heterocyclic amine, aromatic amine and a mixture thereof, (c) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkylamine, polyoxyalkylene alkyl ether, polyvinylpyrrolidone and a mixture thereof, and (d) a mixture thereof.

2. A stable composition according to claim 1 wherein the 2α,3α-epithio-androstane is a member selected from the group consisting of:
2α,3α-epithio-17β-(1-methoxycyclopentyloxy)-5α-androstane,
2α,3α-epithio-17β-(1-ethoxycyclopentyloxy)-5α-androstane,
2α,3α-epithio-17β-(1-propoxycyclopentyloxy)-5α-androstane,
2α,3α-epithio-17β-(1-isopropoxycyclopentyloxy)-5α-androstane,
2α,3α-epithio-17β-(1-t-butoxycyclopentyloxy)-5α-androstane,
2α,3α-epithio-17β-(1-pentyloxycyclopentyloxy)-5α-androstane,
2α,3α-epithio-17β-(1-methoxycyclohexyloxy)-5α-androstane,
2α,3α-epithio-17β-(1-ethoxycyclohexyloxy)-5α-androstane,
2α,3α-epithio-17β-(1-propoxycyclohexyloxy)-5α-androstane,
2α,3α-epithio-17β-(1-butoxycyclohexyloxy)-5α-androstane,
2α,3α-epithio-17β-(1-methoxycycloheptyloxy)-5α-androstane,
2α,3α-epithio-17β-(1-ethoxycycloheptyloxy)-5α-androstane,
2α,3α-17β-(1-propoxycycloheptyloxy)-5α-androstane,
2α,3α-epithio-17β-(1-isobutoxycycloheptyloxy)-5α-androstane and
2α,3α-epithio-17β-(1-pentoxycycloheptyloxy)-5α-androstane.

3. A stable composition according to claim 1, wherein the alkali metal base is a member selected from the group consisting of sodium carbonate, sodium hydrogen carbonate, potassium carbonate, lithium hydroxide, disodium hydrogen phosphate and a mixture thereof.

4. A stable composition according to claim 1, wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-amino-2-methyl-1,3-propanediol, tris-(hydroxymethyl)aminoethane, arginine, lysine, ornithine, cysteine, piperidine, piperazine, morpholine, methenamine, lidocaine, procaine, nicotinamide, pyrazinamide, O,S-bisethoxycarbonylthiamine, pyridine, imidazole, pyridoxine, picoline, diphenylamine, N,N'-dibenzylethylenediamine and a mixture thereof.

5. A stable composition according to claim 1, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinylpyrrolidone, and a mixture thereof.

6. A stable composition according to claim 1, wherein the stabilizer is contained in an amount of 0.01 to 20 percent by weight.

7. A stable composition according to claim 1, wherein the 2α,3α-epithio-androstane is 2α,3α-epithio-17β-(1-methoxycyclopentyloxy)-5α-androstane; the organic base is a member selected from the group consisting of triethylamine and N,N'-dibenzylethylenediamine; and the surface active agent is a polyoxyethylene sorbitan fatty acid ester.

8. A stable composition of a 2α,3α-epithio-androstane, according to claim 1, of the general formula:

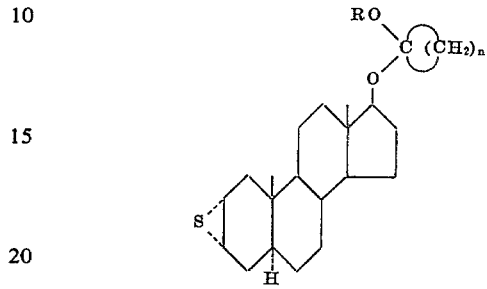

wherein R is a lower alkyl group having one to five carbon atoms and n is an integer of 4–6, containing an effective and non-toxic amount of a stabilizer selected from the group consisting of (a) an organic base selected from the group consisting of aliphatic lower alkyl amine, alcohol amine, amino acid, aliphatic heterocyclic amine, amide compound, aromatic heterocyclic amine, aromatic amine and a mixture thereof, (b) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkylamine, polyoxyalkylene alkyl ether, polyvinylpyrrolidone and a mixture thereof, and (c) a mixture thereof.

9. A stable composition according to claim 8, wherein the 2α,3α-epithio-androstane is a member selected from the group consisting of:
2α,3α-epithio-17β-(1-methoxycyclopentyloxy)-5α-androstane,
2α,3α-epithio-17β-(1-ethoxycyclopentyloxy)-5α-androstane,
2α,3α-epithio-17β-(1-propoxycyclopentyloxy)-5α-androstane,
2α,3α-epithio-17β-(1-isopropoxycyclopentyloxy)-5α-androstane,
2α,3α-epithio-17β-(1-t-butoxycyclopentyloxy)-5α-androstane,
2α,3α-epithio-17β-(1-pentyloxycyclopentyloxy)-5α-androstane, 2α,3α-epithio-17β-(1-methoxycyclohexyloxy)-5α-androstane,
2α,3α-epithio-17β-(1-ethoxycyclohexyloxy)-5α-androstane,
2α,3α-epithio-17β-(1-propoxycyclohecyloxy)-5α-androstane,
2α,3α-epithio-17β-(1-butoxycyclohexyloxy)-5α-androstane,
2α,3α-epithio-17β-(1-methoxycycloheptyloxy)-5α-androstane,
2α,3α-epithio-17β-(1-ethoxycycloheptyloxy)-5α-androstane,
2α,3α-epithio-17β-(1-propoxycycloheptyloxy)-5α-androstane,
2α,3α-epithio-17β-(1-isobutoxycycloheptyloxy)-5α-androstane, and
2α,3α-epithio-17β-(1-pentyloxycycloheptyloxy)-5α-androstane.

10. A stable composition according to claim 8, wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-amino-2-methyl- 1,3- propanediol, tris-(hydroxymethyl)aminoethane, arginine, lysine, ornithine, cysteine, piperidine, piperazine, morpholine, methenamine, lidocaine, procaine, nicotinamide, pyrazinamide, O,S-bisethoxycarbonylthiamine, pyridoxine, imidazole, pyridine, picoline, diphenylamine, N,N'-dibenzylethylene diamine and a mixture thereof.

11. A stable composition according to claim 8, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinylpyrrolidone and a mixture thereof.

12. A stable composition according to claim 8, wherein the stabilizer is contained in an amount of 0.01 to 20 percent by weight.

13. A stable composition of a 2α, 3α-epithio-androstane, according to claim 1, of the general formula:

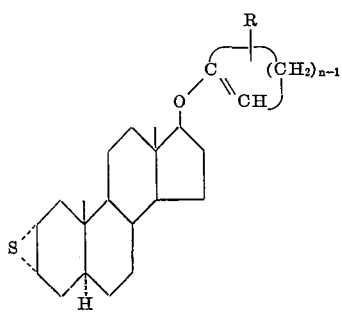

wherein R is a hydrogen atom or lower alkyl group having one to five carbon atoms and $n$ is an integer of 4–6, containing an effective and non-toxic amount of a stabilizer selected from the group consisting of (a) an inorganic base selected from the group consisting of an alkali metal base, hydrazine, methylhydrazine, hydroxylamine, and a mixture thereof, (b) an organic base selected from the group consisting of aliphatic lower alkyl amine, alcohol amine, amino acid, aliphatic heterocyclic amine, amide compound, aromatic heterocyclic amine, aromatic amine and a mixture thereof, (c) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkyl amine, polyoxyalkylene alkyl ether, polyvinylpyrrolidone and a mixture thereof and (d) a mixture thereof.

14. A stable composition according to claim 13, wherein the 2α,3α-epithio-androstane is a member selected from the group consisting of:
  2α,3α-epithio-17β-(1-cyclopentenyloxy)-5α-androstane,
  2α,3α-epithio-17β-(1-cyclohexenyloxy)-5αandrostane,
  2α,3α-epithio-17β-(1-cycloheptenyloxy)-5α-androstane and
  2α,3α-epithio-17β-(3-methyl-1-cyclohexenyloxy)-5α-androstane.

15. A stable composition according to claim 13, wherein the alkali metal base is a member selected from the group consisting of sodium carbonate, sodium hydrogen carbonate, potassium carbonate, lithium hydroxide, disodium hydrogen phosphate and a mixture thereof.

16. A stable composition according to claim 13, wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-amino-2-methyl-1,3-propanediol, tris-(hydroxymethyl)aminoethane, arginine, lysine, ornithine, cysteine, piperidine, piperazine, morpholine, methenamine, lidocaine, procaine, nicotinamide, pyrazinamide, O,S-bis-ethoxycarbonylthiamine, diphenylamine, N,N-dibenzylethylenediamine and a mixture thereof.

17. A stable composition according to claim 13, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinylpyrrolidone and a mixture thereof.

18. A stable composition according to claim 13, wherein the stabilizer is contained in an amount of 0.01 to 20 percent by weight.

19. A stable composition of a 2α,3α-epithio-androstane according to claim 1, of the general formula:

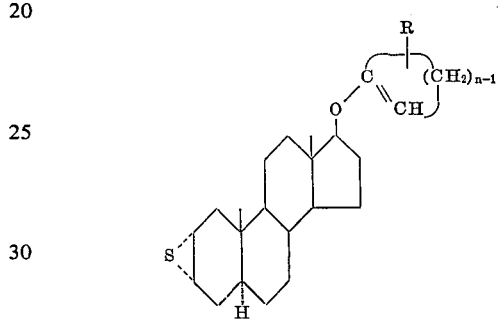

wherein R is a hydrogen atom or lower alkyl group having one to five carbon atoms and $n$ is an integer containing an effective and non-toxic amount of a stabilizer selected from the group consisting of (a) an organic base selected from the group consisting of aliphatic lower alkyl amine, alcohol amine, amino acid, aliphatic heterocyclic amine, amide compound, aromatic heterocyclic amine, aromatic amine and a mixture thereof, (b) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkyl ether, polyoxyalkylene alkyl amine, polyvinylpyrrolidone and a mixture thereof and (c) a mixture thereof.

20. A stable composition according to claim 19, wherein the 2α,3α-epithio-1-androstane is a member selected from the group consisting of:
  2α,3α-epithio-17β-(1-cyclopentyloxy)-5α-androstane
  2α,3α-epithio-17β-(1-cyclohexenyloxy)-5α-androstane,
  2α,3α-epithio-17β-(1-cycloheptenyloxy)-5α-androstane, and
  2α,3α-epithio-17β-(3-methyl-1-cyclohexenyloxy)-5α-androstane.

21. A stable composition according to claim 19, wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-amino-2-methyl-1,3-propanediol, tris-(hydroxymethyl)aminoethane, arginine, lysine, prnithine cysteine, piperidine, piperazine, morpholine, methenamine, lidocaine, procaine, nicotinamide, pyrazinamide, O,S-bisethoxycarbonylthiamine, diphenylamine, N,N-dibenzylethylenediamine and a mixture thereof.

22. A stable composition according to claim 19, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinyl pyrrolidone and a mixture thereof.

23. A stable composition according to claim 19, wherein the stabilizer is contained in a amount of 0.01 to 20 percent by weight.

24. A process for preparing a stabilized composition of a 2α,3α-epithio-androstane, which composes adding a stabilizer selected from the group consisting of (a) an organic base selected from the group consisting of an alkali metal base, hydrazine, methylhydrazine, hydroxylamine and a mixture thereof, (b) an organic base elected from the group consisting of aliphatic lower alkyl amine, alcohol amine amino acid aliphatic heterocyclic amine, amide compound, aromatic heterocyclic amine, aromatic amine and a mixture thereof, (c) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkylamine, polyoxyalkylene alkyl ether, polyvinylpyrrolidone and a mixture thereof and (d) a mixture thereof, to a 2α,3α-epithio-androstane of the general formula:

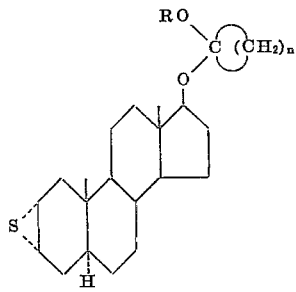

R is a lower alkyl group having one to five carbon atoms and $n$ is an integer of 4–6.

25. A process according to claim 24, wherein the 2α,3α-epithio-androstane is a member selected from the group consisting of:

2α,3α-epithio-17β-(1-methoxycyclopentyloxy)-5α-androstane,
2α,3α-epithio-17β-(1-ethoxycyclopentyloxy)-5α-androstane,
2α,3α-epithio-17β-(1-propoxycyclopentyloxy)-5α-androstane,
2α,3α-epithio-17β-(1-isopropoxycyclopentyloxy)-5α-androstane,
2α,3α-epithio-17β-(1-butoxycyclopentyloxy)-5α-androstane,
2α,3α-epithio-17β-(1-methoxycyclohexyloxy)-5α-androstane,
2α,3α-epithio-17β-(1-ethoxycyclohexyloxy)-5α-androstane,
2α,3α-epithio-17β-(1-propoxycyclohexyloxy)-5α-androstane,
2α,3α-epithio-17β-(1-pentyloxycyclohexyloxy)-5α-androstane,
2α,3α-epithio-17β-(1-butoxycyclohexyloxy)-5α-androstane,
2α,3α-epithio-17β-(1-methoxycycloheptyloxy)-5α-androstane,
2α,3α-epithio-17β-(1-ethoxycycloheptyloxy)-5α-androstane,
2α,3α-epithio-17β-(1-propoxycycloheptyloxy)-5α-androstane,
2α,3α-epithio-17β-(1-isobutoxycycloheptyloxy)-5α-androstane and
2α,3α-epithio-17β-(1-pentyloxycycloheptyloxy)-5α-androstane.

26. A process according to claim 24, wherein the alkali metal base is a member selected from the group consisting of sodium carbonate, sodium hydrogen carbonate, potassium carbonate, lithium hydroxide, disodium hydrogen phosphate and a mixture thereof.

27. A process according to claim 24, wherein the organic base is a member selected from the group consisting of diethylamine, diisopropylamine, dipropylamine, triethylamine, tributylamine, propylenediamine, dipropylamine, propylenediamine, monoethanolamine, diethanolamine, triethanolamine, 2-amino-2-methylpropanol, 2-amino-2-methyl-1,3-propanediol, tris-(hydroxymethyl)-aminoethane, arginine, lysine, ornithine, cysteine, piperidine, piperazine, morpholine, methenamine, lidocaine, procaine, nicotinamide, pyrazinamide, O,S-bisethoxycarbonylthiamine, pyridoxine, imidazole, pyridine, picoline, diphenylamine, N,N'-dibenzylethylenediamine and a mixture thereof.

28. A process according to claim 24, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monooleate, polyethylene glycol, polypropylene glycol, polyoxyethylene oleylamine, polyoxyethylene cetyl ether, polyvinylpyrrolidone and a mixture thereof.

29. A process according to claim 24, wherein the stabilizer is used in an amount of 0.01 to 20 percent by weight.

30. A process according to claim 24, wherein the 2α,3α-epithio-androstane is 2α,3α-epithio-17β-(1-methoxycyclopentyloxy)-5α-androstane; the organic base is a member selected from the group consisting of triethylamine and N,N'-dibenzylethylene-diamine; and the surface active agent is polyoxyethylene sorbitan fatty acid ester.

31. A process for preparing a stabilized composition of a 2α,3α-epithio-androstane, according to claim 24, which comprises adding a stabilizer selected from the group consisting of (a) an organic base selected from the group consisting of aliphatic lower alkyl amine, alcohol amine, amino acid, aliphatic heterocyclic amine, amide compound, aromatic heterocyclic amine, aromatic amine and a mixture thereof, (b) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkylamine, polyoxyalkylene alkyl ether, polyvinylpyrrolidone and a mixture thereof and (c) a mixture thereof, to a 2α,3α-epithio-androstane of the general formula:

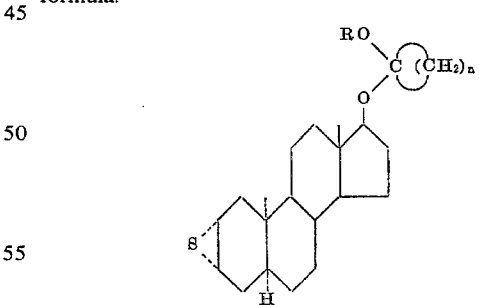

wherein R is a lower alkyl group having one to five carbon atoms and $n$ is an integer of 4–6.

32. A process according to claim 31, wherein the 2α,3α-epithio-androstane is a member selected from the group consisting of:

2α,3α-epithio-17β-(1-methoxycyclopentyloxy)-5α-androstane,
2α,3α-epithio-17β-(1-ethoxycyclopentyloxy)-5α-androstane,
2α,3α-epithio-17β-(1-propoxycyclopentyloxy)-5α-androstane,
2α,3α-epithio-17β-(1-isopropoxycycylopentyloxy)-5α-androstane,
2α,3α-epithio-17β-(1-t-butoxycyclopentyloxy)-5α-androstane,
2α,3α-epithio-17β-(1-pentyloxycyclopentyloxy)-5α-androstane, 2α,3α-epithio-17β-(1-methoxycyclohexyloxy)-5α-androstane,
2α,3α-epithio-17β-(1-ethoxycyclohexyloxy)-5α-androstane,
2α,3α-epithio-17β-(1-propoxycyclohexyloxy)-5α-androstane,
2α,3α-epithio-17β-(1-butoxycyclohexyloxy)-5α-androstane,
2α,3α-epithio-17β-(1-methoxycycloheptyloxy)-5α-androstane,
2α,3α-epithio-17β-(1-ethoxycycloheptyloxy)-5α-androstane,
2α,3α-epithio-17β-(1-propoxycycloheptyloxy)-5α-androstane,
2α,3α-epithio-17β-(1-isobutoxycycloheptyloxy)-5α-androstane and
2α,3α-epithio-17β-(1-pentyloxycycloheptyloxy)-5α-androstane.

33. A process according to claim 31, wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-methyl-2-amino-1,3-propanediol, tris-(hydroxymethyl)aminoethane, arginine, lysine, ornithine, cysteine, piperidene, piperazine, morpholine, methenamine, lidocaine, procaine, nicotinamide, pyrazinamide, O,S-bis-ethoxycarbonylthiamine, pyridoxine, imidazole, pyridine, picoline, diphenylamine, N,N'-dibenzylethylamine and a mixture thereof.

34. A process according to claim 31, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monoplamitate, polyoxyethylene sorbitan monooleate, polyethylene glycol, polypropylene glycol, polyoxyethylene oleylamine, polyoxyethylene cetyl ether, polyvinylpyrrolidone and a mixture thereof.

35. A process according to claim 31, wherein the stabilizer is used in an amount of 0.01 to 20 percent by weight.

36. A process for preparing a stabilized composition of a 2α,3α-epithio-androstane, according to claim 38, which comprises adding a stabilizer selected from the group consisting of (a) an inorganic base selected from the group consisting of an alkali metal base, hydrazine, methylhydrazine, hydroxylamine and a mixture thereof, (b) an organic base selected from the group consisting of aliphatic lower alkylamine, alcohol amine, amino acid, aliphatic heterocyclic amine, amide compound, aromatic heterocyclic amine, aromatic amine and a mixture thereof, (c) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkylamine, polyoxyalkylene alkyl ether, polyvinylpyrrolidone and a mixture thereof and (d) a mixture thereof, to a 2α,3α-epithio-androstane of the general formula:

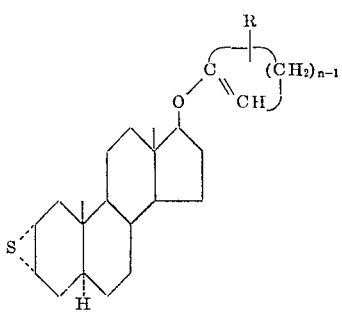

wherein R is a hydrogen atom or lower alkyl group having one to five carbon atoms and n is an integer of 4–6.

37. A process according to claim 36, wherein the 2α,3α-epithio-androstane is a member selected from the group consisting of:
2α,3α-epithio-17β-(1-cyclopentynyloxy)-5α-androstane,
2α,3α-epithio-17β-(1-cyclohexenyloxy)-5α-androstane,
2α,3α-epithio-17β-(1-cycloheptenyloxy)-5α-androstane,
2α,3α-epithio-17β-(3-methyl-1-cyclohexenyloxy)-5α-androstane.

38. A process according to claim 36, wherein the alkali metal base is a member selected from the group consisting of sodium carbonate, sodium hydrogen carbonate, potassium carbonate lithium hydroxide, disodium hydrogen phosphate and a mixture thereof.

39. A process according to claim 36 wherein the organic base is a member selected from the group consisting of diethylamine, diisopropylamine, dipropylamine, triethylamine, tributylamine, propylenediamine, monoethanolamine, diethanolamine, triethanolamine, 2-amino-2-methylpropanol, 2-amino-2-methyl-1,3-propanediol, tris-(hydroxymethyl)aminoethane, arginine, lysine, ornithine, cysteine, piperidine, piperazine, morpholine, methenamine, lidocaine, procaine, nicotinamide, pyrazinamide, O,S-bis-ethoxycarbonylamine, pyridoxine, imidazole, pyridine, picoline, diphenylamine, N,N'-dibenzylethylenediamine and a mixture thereof.

40. A process according to claim 36, wherein the surface active agent is a member selected from the group consisting of oleic acid monoglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinylpyrrolideone and mixtures thereof.

41. A process according to claim 36, wherein the stabilizer is used in a a mount of 0.01 to 20 percent by weight.

42. A process for preparing a stabilized composition of a 2α,3α-epithio-androstane, according to claim 24, which comprises adding a stabilizer selected from the group consisting of (a) an organic base selected from the group consisting of aliphatic lower alkyl amine, alcohol amine, amino acid, aliphatic heterocyclic amine, amide compound, aromatic heterocyclic amine, aromatic amine and a mixture thereof, (b) a surface active agent selected from the group consisting of fatty acid glyceride, sorbitan fatty acid ester, polyglycerine ester, polyoxyethylene sorbitan fatty acid ester, polyalkylene glycol, polyoxyalkylene alkyl amine, polyoxyalkylene alkyl ether, polyvinylpyrrolidone and a mixture thereof and (c) a mixture thereof to a 2α,3α-epithio-androstane of the general formula:

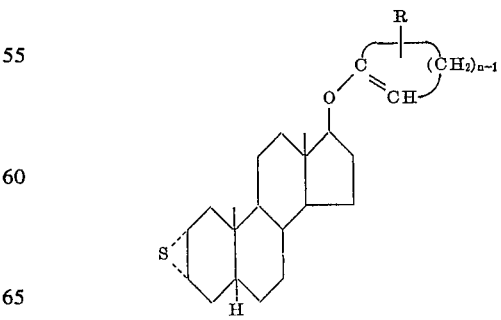

wherein R is a hydrogen atom or lower alkyl group having one to five carbon atoms and n an integer of 4–6.

43. A process according to claim 42, wherein the 2α,3α-epithio-androstane is a member selected from the group consisting of:
2α,3α-epithio-17β-(1-cyclopentenyloxy)-5α-androstane,
2α,3α-epithio-17β-(1-cyclohexenyloxy)-5α-androstane,
2α,3α-epithio-17β-(1-cycloheptenyloxy)-5α-androstane and 2α,3α-epithio-17β-(3-methyl-1-cyclohexenyloxy)-5α-androstane, 44. A process according to claim 42, wherein the organic base is a member selected from the group consisting of diethylamine, diisopropylamine, dipropylamine, triethylamine, tributylamine, propylenediamine, monoethanolamine, diethanolamine triethanolamine, 2-amino-2-methylpropanol, 2-amino-2-methyl-1,3-propanediol, tris-(hydroxymethyl)aminoethane, arginine, lysine, ornithine, cysteine, piperidine, piperazine, morpholine, methenamine, lidocaine, procaine, nicotinamide, pyrazinamide, O,S-bis-ethoxycarbonylthiamine, pyridoxine, imidazole, pyridine, bicoline, diphenylamine, N,N'-dibenzylethylenediamine and thereof.

45. A process according to claim 42, wherein the surface active agent is a member selected from the group consisting of oleic acid monglyceride, oleic acid diacetylglyceride, stearic acid triglyceride, sorbitol stearate, sorbitol oleate, hexaglycerol monooleate, decaglycerol tetraoleate, polyoxyethylene sorbitan monolaurate, polyoxyethylene sorbitan monopalmitate, polyoxyethylene sorbitan monooleate, polyethylene glycol, polypropylene glycol, polyoxyethylene oleylamine, polyoxyethylene cetyl ether, polyvinylpyrrolidone and a mixture thereof.

46. A process according to claim 42, wherein the stabilizer is used in an amount of 0.01 to 20 percent by weight.

* * * * *